United States Patent [19]

Rynne

[11] Patent Number: 5,136,173
[45] Date of Patent: Aug. 4, 1992

[54] OCEAN WAVE ENERGY CONVERSION SYSTEM

[75] Inventor: Timothy M. Rynne, Huntington Beach, Calif.

[73] Assignee: Scientific Applications & Research Associates, Inc., Huntington Beach, Calif.

[21] Appl. No.: 749,944

[22] Filed: Aug. 26, 1991

[51] Int. Cl.$^5$ .................................... F03B 13/12
[52] U.S. Cl. ............................ 290/53; 290/42; 310/11
[58] Field of Search ................ 290/42, 53; 310/11

[56] References Cited

U.S. PATENT DOCUMENTS 4,110,630  8/1978  Hendel ............................ 290/53
4,151,423  4/1979  Hendel ............................ 290/54

OTHER PUBLICATIONS

Atkins, *Physical Chemistry*, 1978, p. 819f.
CRC Press, *Handbook of Chemistry and Physics*, 1989 p. D-252.
Fisher, R. B. and Peters, D. G., Quantitative Chemical Analysis, Dec. 1969, pp. 844–845 & 848.
Kennish, ed, *Practical Handbook of Marine Science*, 1989, p. 49f.
Hughes & Young, *The Electrodynamics of Fluids*, 1966.

Primary Examiner—A. D. Pellinen
Assistant Examiner—Robert Lloyd Hoover
Attorney, Agent, or Firm—John J. Murphey

[57] ABSTRACT

An ocean wave energy conversion system comprising a float adapted to ride on the surface of the ocean in reciprocal vertical motion in response to ocean wave front action, first support means extending downward from the float deeper into the ocean; and, magnetohydrodynamic electric generator means mounted to the first means at a level of attenuated vertical wave action in the ocean, the generator comprising a duct arranged to channel the flow of sea water vertically therethrough in response to the reciprocal vertical motion of the float, second means including magnetic field elements for applying a strong magnetic field cross-wise to the longitudinal axis of the duct and the flow of sea water therethrough, electrode means positioned in the duct and in contact with the flowing sea water therethrough such that the electrode means receives electrical energy generated by magnetohydrodynamic phenomenon as the sea water passes upwardly and downwardly in a relative manner through the magnetic field, and transfer means connected to the electrode for conveying the generated electrical energy outward from the magnetohydrodynamic electric means generator to an external electric load.

19 Claims, 3 Drawing Sheets

OCEAN WAVE ENERGY CONVERSION SYSTEM

BACKGROUND OF THE INVENTION

1. Field of the Invention

This invention relates to the field of electrical generation. More particularly, it relates to the field of generating units of the type that convert the kinetic energy of ocean wave into electrical energy usable for consumption, conversion and/or transmission for a variety of purposes.

2. Description of the Prior Art

Electrical energy, the power to light the darkness, to run machines, to power television and telephone communication systems, to provide fresh water, and other processes, is needed by mankind in constantly increasing amounts. Virtually every mechanical, electrical and chemical machine or process requires the input of electrical energy. Conventional sources of electrical energy are presently subject to a variety of pressures. For instance, nuclear power is becoming less attractive because of safety reasons; the use of coal is being scaled back for environmental reasons; oil is becoming scarce for political reasons; and, supplies of natural gas are being used up at an alarming rate. Accordingly, another source of electrical energy is vitally needed to sustain the earth and its inhabitants in their continuing lifestyles.

The ocean, with its seemingly endless crashing of waves, historically has been considered a potential source of useful energy. In addition, ocean waves have caused an enormous amount of erosion to coastal regions. To capture all or a portion of this wave energy would not only supplement the rising need for electricity but would have far-reaching beneficial effects on the various coastal areas of the world.

For instance, it has been empirically calculated that capturing only one-half of the energy of the ocean wave that are 12 to 14 inches high and driven by a wind speed of 10 knots per hour, would yield power on the order of 200 watts per meter of wave front. Capturing one-half of higher waves, driven by a wind speed of 20 knots per hour, would yield power on the order of 10,000 watts or 10 kilowatts per meter of wave front. Capturing 90% of that power would increase the energy yields from 200 to 700 watts per meter and 10 to 42 kilowatts per meter, respectively. Should the wind increase in velocity to 50 knots per hour, a 90% capture of the energy would yield over 10 megawatts per meter. Empirical data shows that yearly average power densities available along coastal areas of the world vary from values of a few kilowatts per meter of wave front up to about 100 kilowatts per meter of wave front.

It can readily be seen therefore, that extraction of energy from the ocean can indeed be large and favorable to the inhabitants of this planet. In fact, under optimum circumstances, the continental United States could theoretically extract nearly 1 trillion kilowatt hours of energy annually, thus approaching present levels of hydroelectric energy production. In addition, high efficiency extraction of this energy from wave fronts approaching the shoreline would reduce the waves to near sea level in height and substantially reduce the erosive effects of pounding seas on our coast lines.

There have been numerous attempts to harness the power of ocean waves. Virtually all of them have failed to receive widespread acceptance. The various reasons for failure appear to range from the uneconomical nature of previous approaches to a failure to understand the basis of wave motion. The more simplified prior art attempts concern air turbines mounted over the wave fronts ducted to allow the wave fronts to force air up and down through the turbine blades to drive a turbine-electrical generator unit. Another form utilizes a sealed container mounted slightly below the surface of the sea where the top of the container is flexible. Intake and exhaust ports in the container are equipped with one-way valves and allow the container to pump liquids when the flexible top of the container rises and falls with the wave fronts.

Another invention, known as "Salter's Duck", includes an elongated member mounted at one end on a shaft and placed in the wave fronts. As the waves wash over the member (the ducks' "bill"), it rises and falls and rotates the shaft. Still another form utilizes an ordinary paddle wheel mounted on a shaft and set upright in the wave fronts to be turned by the wave fronts as they "go by". Yet another form of prior art includes a conveyor belt containing "impact" clips that extend outward therefrom, the belt is mounted parallel above the wave fronts so that the clips are struck by the advancing waves to move the belt and turn a pair of shafts.

Much of the non-acceptance of these inventions is based upon the difficulty of maintaining the devices in operable condition. Wave action constantly pounds the support structures as well as the conversion unit and, in many cases, literally breaks up the units so that they are no longer operable. In addition, elements that are to be driven by the advancing waves are often mounted on shafts that become corroded by the action of sea water and wind over a short period of time. Larger units require more massive structures and thereby impart a problem with friction and momentum such that the devices only become operable under extreme wave conditions and then are pounded by the heavy waves.

Non-acceptance has also stemmed from a failure to understand wave action. Water really doesn't move horizontally with the wave motion as much as it does in a circular motion during wave action. Many of the prior art devices are based upon the premise that water will migrate far more in the horizontal plane than in the vertical plane. In reality, the water particles move under an influence of both vertical forces and horizontal forces to trace a circle or elliptical path in a vertical plane during wave action.

In 1979, U.S. Pat. No. 4,151,423 was issued. This patent discloses a magnetohydrodynamic (MHD) electric generator for the direct energy conversion of the kinetic energy using ducted sea water flowing horizontally through a magnetic field, preferably through a constricted portion of the duct. This patent shows some embodiments wherein wave action is used to supplement the flow of water through the horizontally-arranged MHD duct; the supplemental water flow coming from a variety of pumps that are driven by wave energy. However, the MHD generator remains still in the water and requires either the slight horizontal movement of wave action to drive the water through the horizontally-arranged duct or, use that flow plus the supplemented flows stemming from the wave-generator devices, to produce electric energy by magnetohydrodynamic forces. Such a device clearly requires a substantial capital investment. The duct and its associated hardware are mounted just under the surface of the ocean and face all the aforesaid problems of pounding waves and corrosive wind/water action.

Another problem associated with prior art devices is that they are designed for installation at or just below the surface of the ocean. Air bubbles and debris are prevalent at this level and often interfere with the planned path of movement of the water through the device. In addition, where the devices utilize heavy flows of sea water, a substantial amount of cavitation is often encountered which severely decreases the efficiency of energy conversion.

SUMMARY OF THE INVENTION

The instant invention is a device that overcomes or renders manageable most, if not all, of the problems associated with the prior art in the direct conversion of ocean waves to electricity. The invention comprises an MHD electrical-generating chamber suspended in deep water in a vertical position and held there by a float positioned above in the ocean surface. The MHD generator comprises a duct through which sea water passes as it is moved up and down relative to the almost stationary deep water by the action of the ocean waves on the float. The duct may have a flared inlet and outlet end sections to create a Bernoulli effect to increase the velocity of the water passing up and down through the duct. A strong magnetic field, generated by electromagnets or other methods (e.g. super conductors) is impressed across the duct and a set of electrodes is placed in the duct, crosswise to the flow of sea water and the magnetic field. The flow of sea water develops an electric current in its interaction with the magnetic field that is removable by the electrodes for transfer by insulated conductors through various circuitry to various loads such as for storage in batteries for later use, for water desalinization through hydrolysis, or to provide real time electric power to store or transmit elsewhere.

Other than the float, the primary production element remains below the ocean surface, thus out of sight, so as not to destroy the beauty of the sea. The duct is suspended in water such that the MHD section is in a region where the fluid motion is diminished from that at the surface of the sea. By suspending the device in deep water, cleaner water at higher densities are encountered and cavitation is minimized. The device has no internal moving parts so that the corrosive effects of the sea water are greatly diminished. The device directly converts wave motion into electricity without the use of intermediate rods, cams, shafts, etc. When located near shore, the removal of kinetic energy from the waves results in a calming influence on the water and makes the shore safe from further destruction by wave action. Many devices may be strung along the shore to capture and tame approaching wave fronts or be allowed to float freely in the ocean and provide a storage facility for the generated electricity. Very importantly, is the fact that there are no pollution products emanating or created by the use of this invention. Also, the device will continue to produce electricity, day and night, as long as there are waves in the ocean. Even further, the load on the device may be changed at will to extract various amounts of energy from the ocean. During periods of intense storm activity, the device may be brought up to full load to extract as much energy a possible so as to reduce, as much as possible, the damaging effects of the crashing waves upon the shoreline.

Accordingly, the main object of this invention is an oceanwave energy conversion system for generating continuous amounts of electricity using no internal moving parts. Other objects of the invention include a device for directly converting the kinetic energy of ocean waves to electricity without the need for intermediate rods, cams, shafts, etc.; a device that may be utilized in open ocean operation or tethered or controlled to lie close to the shore of land masses to attenuate the unwanted effects of wave action on the land by removing kinetic energy from the waves and converting it directly to electricity; a device that will convert ocean wave energy to electricity over a wide variety of frequencies of waves, wave height and duration; a device that produces electrical energy with no pollution by-products; a device that may be used in developing sources of fresh water, oxygen and hydrogen for use in other energy systems; and, a device that will produce electricity for transmission to shore for immediate consumption, that can be stored for later use, and that may be used in a variety of locations throughout the world without the need to modify the device.

These and other objects of the invention will become more apparent upon reading the following description of the preferred embodiment taken together with the drawings attached hereto. The scope of protection sought by the inventor may be gleaned from a fair reading of the claims that conclude this specification.

DESCRIPTION OF THE DRAWINGS

FIG. 4a is a top, cross-sectional view of another embodiment of an MHD electrical generator usable in this invention; and, FIG. 4b is a side cross-sectional view taken along the line 4b—4b of the embodiment shown in FIG. 4a.

DESCRIPTION OF THE PREFERRED EMBODIMENT

Figure 1:
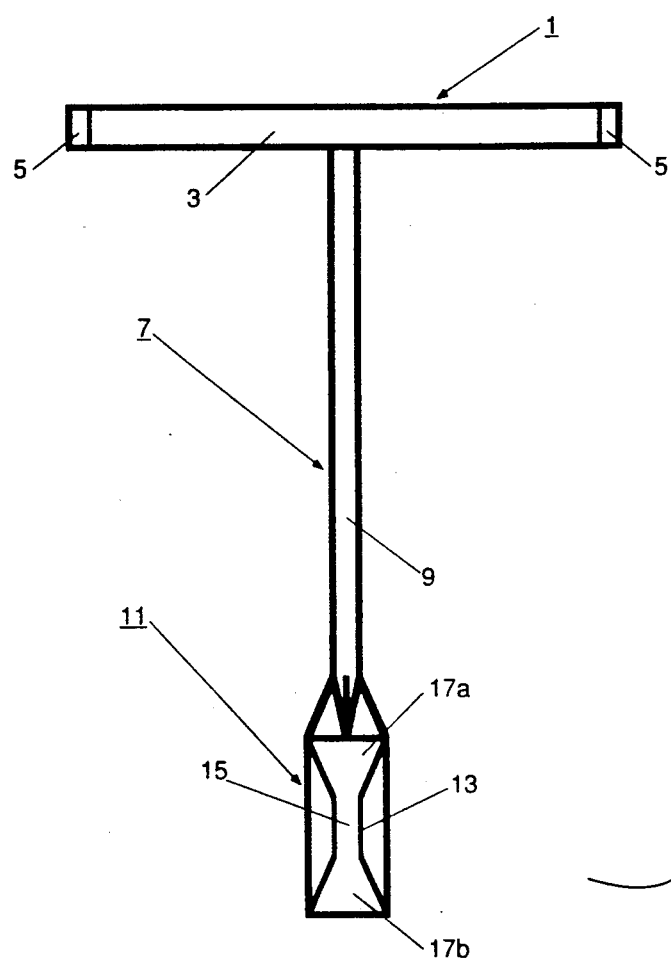
FIG. 1 is a side elevational view of the preferred embodiment of this invention.
Figure 2:
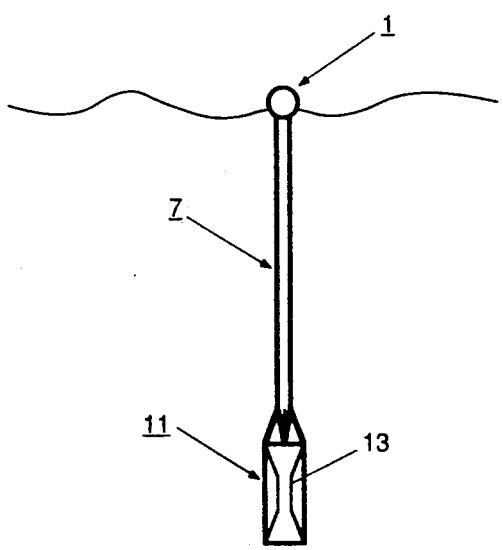
FIG. 2 is another side elevational view of the invention shown positioned in the ocean wave front environment.

Turning now to the drawings wherein like elements are identified with like numerals throughout the six figures, FIGS. 1 and 2 show a float 1 comprising a length of hollow or floatable material such as a pipe 3 terminated by a pair of end caps 5. While a number of materials appear as viable candidates for float 1, the material used will depend upon the overall size of the unit and other factors such as strength-to-weight ration as well as overall cost. In some instances plastic pipe or Kelvar (trademark) tethers may be useful while in other cases mild steel will be the best candidate. In all events, the float must provide sufficient buoyancy but low enough mass as to allow the whole system's vertical motion to track the surface wave motion.

Float 1 is set in the ocean or other water mass and allowed to float freely on the ocean surface or, more preferably, be tethered to maintain a set location and arranged to always lie in a specific orientation parallel to the line of advancing wave fronts as shown in FIG. 2. Such tethering may be accomplished with rope, pulleys and anchors, as is already known in the art. Methods of aligning float 1 parallel to the line of advancing wave fronts may be accomplished using orientation devices such as Raleigh disks or the like. Modernly, the use of gyroscopically-controlled or satellite-controlled positional electric motors (not shown) may be used to control rudders and drive propellers to continually position float 1 parallel to the line of advancing wave fronts and at a set geographic location. Since advancing wave fronts virtually always strike land masses parallel to the beaches, a plurality of floats may be arranged in a line or lines parallel to the beach and offshore to form a barrier to the beach and maintain the invention offshore in a position to extract sufficient kinetic energy from the advancing wave fronts to reduce the incidence of wave front erosion against the land mass.

A first support means 7 is provided to extend downward from the center of float 1 in the sea, preferably at a level where action is almost totally attenuated. For example, for deep water operations, this depth may be as little as 15 feet or as much as 80 to 100 feet or more, depending upon the overall depth of the sea, the surrounding topography and the normal height of the wave fronts. For instance, for a mean wave front height of $5\frac{1}{2}$ feet, an average wave front period on the order of 5.7 seconds and a wave front-length of around 111 feet, first means 7 would have a length of about 25 feet to lie in water where the relative vertical motion is decreased by more than 60% of that of the surface. Thus, by positioning the MHD unit on first means 7 under water a depth of 25 feet will locate it in an area where vertical movement of the surrounding sea water by the wave fronts is relatively surpressed. Increasing the length further will diminish the relative movement of the surrounding sea water even further and thereby increase the overall efficiency of the system. Analogously, operation in shallow areas (i.e., areas where the ocean depth is not that great) will allow for a decrease in the length of means 7. While for many purposes first support means 7 will be a rigid support, pipe or structure, there are instances wherein it may take the form of a cable or other flexible line. This latter situation would occur where the MHD unit is heavy enough to continually hold its relative position below float 1 and have a period of oscillation such that it will always sink faster than the drop in float 1 when a wave front passes by.

Means 7 may comprise an elongated pipe 9, as shown in FIGS. 1 and 2, or other material sufficiently strong yet light weight. The floatation of means 7 may be added to that of float 1 and augment its floatation capacity. However, pipe 9 may carry electrical conductors from the MHD unit up to or near the surface of the ocean for the purpose of bringing generated electric power to the surface for subsequent use for transmission to land, contain two or more tubes or lines for carrying oxygen and hydrogen gasses from the hydrolysis unit, run by the MHD unit, to land or other storage facility, a pipe for containing control lines, test lines and readout facilities located on or in connection with the MHD unit, etc. Other configurations of first means 7 contemplate the use of lattice structures or support structures of plastic and/or metal for use in mounting the MHD unit below float 1.

Figure 3A:
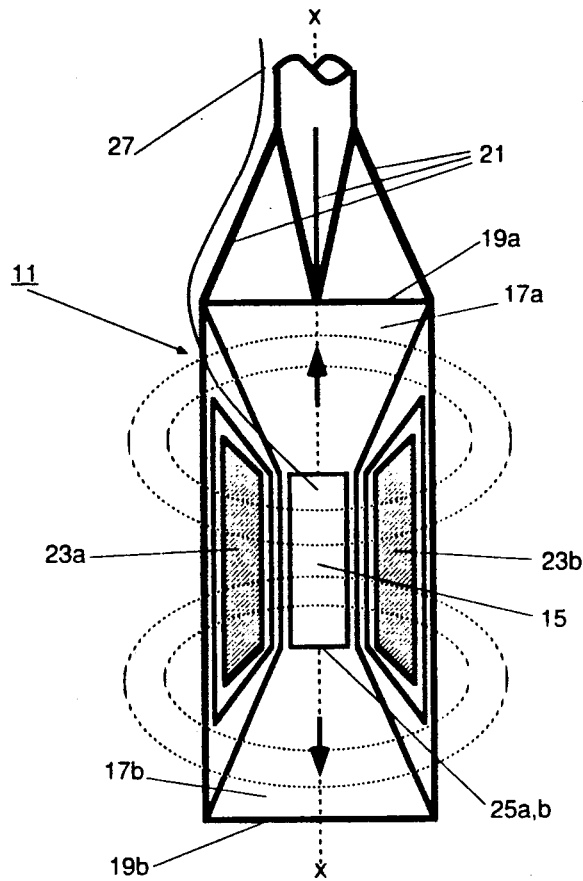
FIG. 3a is a close-up side view, partly in section, of the MHD electrical generator portion of this invention.
Figure 3B:
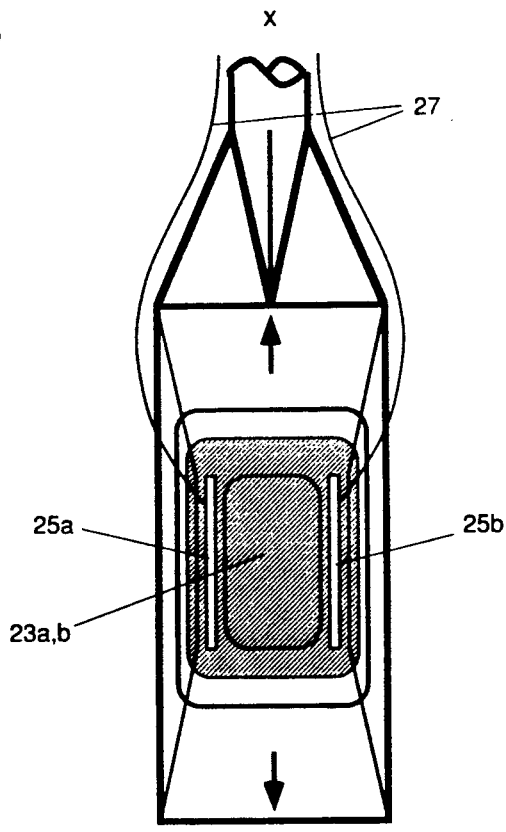
FIG. 3b is the same view as shown in 3a rotated 90°.

A magnetohydrodynamic (MHD) electric power generating unit 11 is shown in FIGS. 2, 3a and 3b to be attached to first means 7 and suspended therefrom under the surface below float 1. MHD unit 11 comprises a duct 13 preferably containing an elongated constricted portion 15 of smaller diameter and bounded at each end by outward opening flared passageways 17a and 17b axially interconnected to duct 13 along central duct axis x—x, and terminated by spaced-apart upper and lower duct ends 19a and 19b respectively. Duct 13 is shown to be arranged vertical to the surface of the ocean wherein it is suspended and is connected at its upper duct end 19a to means 7 by conventional means including gusset plates 21. Opposed magnetic field elements 23a and 23b are shown in FIGS. 3a and 3b and are provided on opposite sides of constricted portion 15 to develop magnetic fields on the order of one Tesla or more. It is preferred that elements 23a and 23b include superconductors, cooled by liquid nitrogen or other coolant to provide magnetic saturation fields on the order of ten Tesla or more. The magnetic field, as shown in FIG. 3a by dotted lines, contains lines of magnetic flux that are crosswise to the central axis x—x of duct 13.

As shown in FIGS. 2 and 3a, as float 1 rides up and down in the wave front action of the surface of the ocean, it propels MHD unit 11 and first means 7 in an up and down reciprocal path. A pair of electrodes 25a and 25b, made of graphite or other such material, is arranged in spaced-apart position in direct contact with the flowing water, inside and along the edges of duct constricted portion 15 and cross-wise or at an angle to the flow of sea water therethrough and to the lines of magnetic force. Electrodes 25a and 25b are connected to conductors 27 that pass outside constricted portion 15 for conveying away the MHD-generated electric power.

Because of the phenomenon of magnetohydrodynamics, an electric field is produced orthogonal to both the direction of the flow of sea water and the direction of the magnetic field and said electric current is drawn off by electrodes 25a and 25b and conveyed away by conductors 27.

As float 1 rises in the wave front, MHD unit 11 is caused to move vertically upward (or upstroke) and sea water, predominately at rest in the region of MHD unit 11, will move downward with respect to unit 11 through intake flared passageway 17a, into and through constricted portion 15, as indicated by the arrow in FIG. 3a, through the lines of magnetic flux produced by field elements 23a and 23b and out flared passageway 17b. When float 1 sinks into the trough between the wave fronts, as the first wave front passes by, MHD unit 11 is plunged deeper (the downstroke) into the water causing the locally still sea water to move upward relative to flared passageway 17b then upward through elongated constricted portion 15 and out flared passageway 17a, as indicated by the arrow in FIG. 3a, or the reverse of the previous flow. The magnetohydrodynamic effect will produce electricity independent of the direction of the flow of the salt water through constricted portion 15, however, the polarity of the generated power will change between the upstroke and the downstroke. Rectifiers (not shown) may be provided, along with other electrical equipment, to regulate the polarity change such that a constant flow of direct current is ultimately produced and transmitted to nearby electrical loads or other facilities through insulated conductors 27.

Figure 4A:
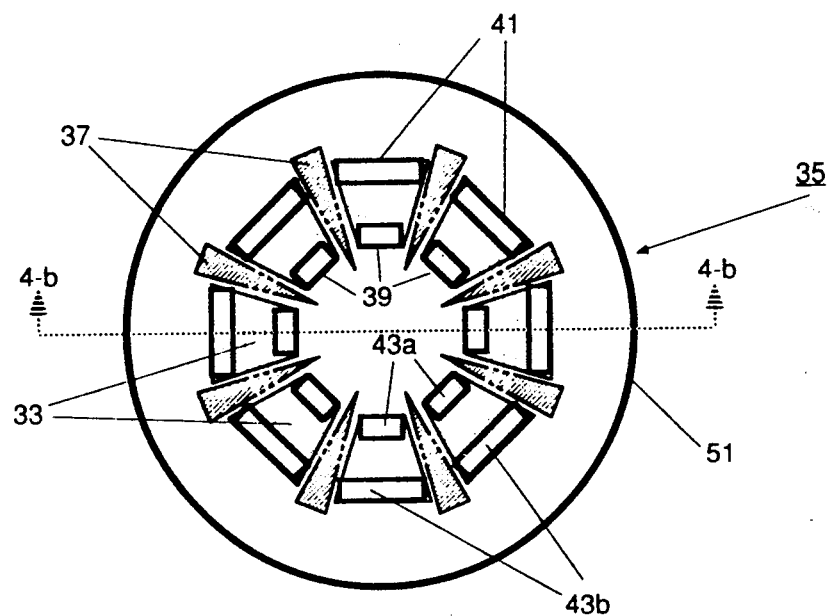
Figure 4B:
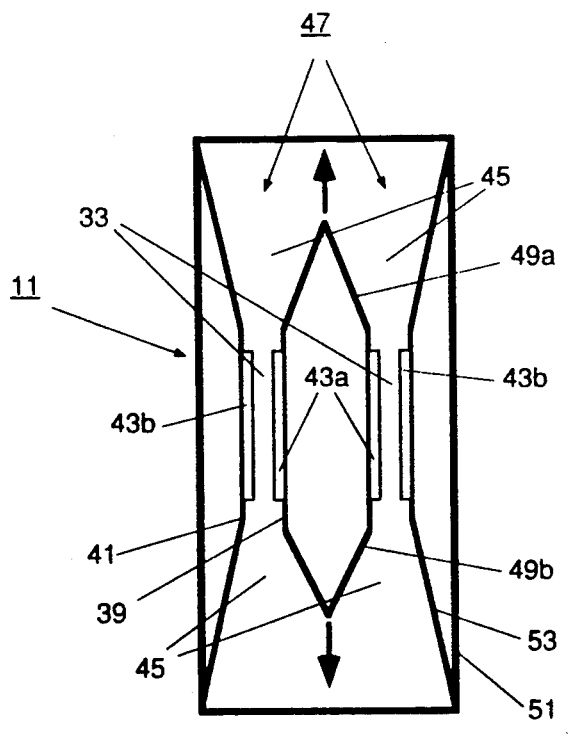

Another embodiment of this invention is shown in FIGS. 4a and 4b to comprise a plurality of separate duct segments 33 assembled together to form a polygonal solenoidal structure 35. Each segment 33 contains one wedge-shaped magnetic side element 37 and is bounded by spaced-apart front and back walls 39 and 41 respectively. A pair of electrode 43a and 43b is mounted one each at or near each wall 39 and 41. Each segment 33 is open at the top and bottom to form a passageway 45 for the passage of sea water therethrough. Diverter means 47, preferably in the form of a pair of conical elements 49a and 49b in mutual, faced-apart arrangement located centrally respectively at the upper and lower ends of structure 35, is placed at the center of structure 35 to divert the sea water outward toward passageways 45. A shell or covering 51 including a neck section 53 surrounds structure 35 and prevents the sea water from escaping through segments 33 as the whole structure is raised and lowered in the water by wave action on float 1. When energized, magnetic side elements 37 work together to generate a toroidal-shaped magnetic field, shown in dotted lines in FIG. 4a, that passes substantially cross-wise through passageway 45 of each segment. This configuration provides for a continuous toroidal-shaped flux pattern that remains almost totally within the operating confines of structure 35 to provide more efficiency to the magnetohydrodynamic phenomenon.

By placing MHD unit 11 at appropriate depths under the surface of the sea, a number of advantages are obtained over those inventions of the prior art. First, the MHD unit operates deep in the ocean in dense water. Water near the surface of the ocean contains bubbles of air generated by wave front action, minute pieces of sea weed, small fishes and animal life, jetsam and flotsam. All of these foreign materials and air tend to reduce the density of the water current flowing through the duct and reduce the amount of energy converted to electricity. Further, the extraneous material clogs the constricted portion 15 of the MHD unit and lowers the efficiency and power output of the unit. Still further, at these depths the pressure of sea water is greater and cavitation is decreased to allow for more efficient generation of power. By suspending the MHD unit deep in the water, most, if not all, of foreign material is avoided so that the chances of having such material impact and damage the electrodes is greatly diminished.

Secondly, there is no need to force water through duct 13. The up and down reciprocal motion of MHD unit 11, by action of float 1 through first means 7, will cause the sea water to move through duct 13 and generate electricity by nature's force, alone. Thirdly, there are no moving parts that would require maintenance. Fourthly, there are no pollution issues to be generated because the device hangs passively in the ocean and does not generate any dangerous materials other than electricity, oxygen and hydrogen—these latter two being produced when unit 11 is being used as a hydrolysis machine.

Flared passageways 17a and 17b generate compression of the water flowing through in constricted duct portion 15 under the Bernoulli principle. This compression causes an increase in velocity of sea water through constricted portion 15 no matter which direction MHD unit 11 is moving, i.e., upward or downward. It has been determined that the provision of flared passageways 17a and 17b on both ends of constricted duct portion 15 results in Reynolds numbers below 1000 indicating that laminar flow exists during the passage of sea water through duct 15 to maximize the generation of electrical energy. The same holds true for the embodiment shown in FIGS. 4a and 4b.

The amount of electricity generated by this device can be significant. For instance, assuming a one Tesla magnetic field, with a 100 cubic meter working volume (duct volume), developed by superconductors as elements 23 of the type presently commercially available, would allow for a maximum power generation of about 880 mega-watts. By increasing the magnetic field strength one may reduce the working volume of the duct to reduce the mass of the unit and lower its cost while simultaneously being able to install more of them within a given area. During period of intense wave action, the load on Unit 11 may be increased to maximize extraction of as much energy as possible to reduce wave action and protect shorelines. It has been conservatively estimated that the coastal energies of the continental United States have wave front power densities on the order of 20 to 40 kilowatts per meter parallel to the wave front. Accordingly, a number of units placed about the coast of the United States have a potential for generating power approaching 30 gigawatts, a sizeable percentage of overall U.S. power consumption.

Platforms could be built in conjunction with float 1 to serve as centers for aqua-cultural activity utilizing the power generated by the MHD unit slung below to run the equipment needed to service the aquaculture. A large number of these devices may be located in areas under constant erosion by wave action to control future wave damage. These units may also be used to generate hydrogen and oxygen for consumption as fuel in coastal areas thus eliminating much of the $CO_2$ pollution which is presently produced by hydrocarbon fuels and of present concern with respect to the global heating issue. Units producing hydrogen and oxygen would also produce fresh water as a by-product which can then be used by local communities to off-set drought conditions that may occur in the arid inland coastal areas.

Electrical conductors 27 need to be appropriately insulated to prevent leakage of the generated electrical energy from escaping to the near-by sea water. The same holds true for rectifiers and all other electrical components used in treating the electrical energy after it is picked off by electrodes 25a and 25b in unit 11.

While the invention has been described with reference to two particular embodiments, those skilled in the art will be able to make various modifications to the invention without departing from the true spirit and scope thereof. It is intended that all combinations of elements and steps which perform substantially the same function in substantially the same way to achieve the same results are within the scope of this invention.

What is claimed is:

1. An ocean wave energy conversion system comprising:
   a) a float adapted to ride on the surface of the ocean in reciprocal vertical motion in response to ocean wave front action;
   b) first support means extending downward from said float deeper into the ocean; and,
   c) magnetohydrodynamic electric generator means mounted to said first means at a level of attenuated vertical wave action in the ocean, said generator comprising:
      i) a duct arranged to channel the flow of sea water vertically therethrough in response to the reciprocal vertical motion of said float;
      ii) second means including magnetic field elements for applying a strong magnetic field cross-wise to the longitudinal axis of said duct and the flow of sea water therethrough;
      iii) electrode means positioned in said duct and in contact with the flowing sea water therethrough such that said electrode means receives electrical energy generated by magnetohydrodynamic phenomenon as the sea water passes upwardly and downwardly in a relative manner through the magnetic field; and, iv) transfer means connected to said electrode for conveying the generated electrical energy outward from said magnetohydrodynamic electric means generator to an external electric load.

2. The ocean wave energy conversion system of claim 1 further including an elongated constricted portion formed in said duct and axially aligned therewith, defined by a pair of outwardly opening, flared passageways extending from each end of said constricted portion for increasing the velocity of sea water therethrough.

3. The ocean wave energy conversion system of claim 1 wherein said first support means provides rigid support to said magnetohydrodynamic electric generator means.

4. The ocean wave energy conversion system of claim 1 wherein said second means applies a magnetic field orthogonal to the flow of sea water through said duct.

5. The ocean wave energy conversion system of claim 1 wherein said magnetic field elements include superconductors to apply a significantly strong magnetic field cross-wise to the longitudinal axis of said duct.

6. The ocean wave energy conversion system of claim 1 wherein said electrode means are positioned orthogonal to the magnetic field and to the flow of sea water through said elongated constricted portion for receiving the electrical energy generated therein.

7. The ocean wave energy conversion system of claim 1 further including rectifying means for controlling the polarity of the electrical energy generated in said magnetohydrodynamic electric generator means to provide a constant polarity to the energy transmitted therefrom.

8. The ocean wave energy conversion system of claim 1 wherein said electrode means includes means connected to said electrode means for operating a hydrolysis generating unit to produce oxygen and hydrogen gasses.

9. The ocean wave energy conversion system of claim 1 wherein said electrode means include's means connected to said electric means for converting sea water to fresh water.

10. The ocean wave energy conversion system of claim 5 further including cooling pipes arranged in connection with said superconductor magnetic field elements to provide a low temperature environment for said superconductors to develop a significantly strong magnetic field.

11. The ocean wave energy conversion system of claim 1 wherein said magnetohydrodynamic generator means, mounted to said first means, comprises a plurality of separate duct segments, each said segment having enclosed sides and an open top and bottom forming a passageway through which sea water may pass, said segments defined by a pie-shaped magnetic side element and a pair of spaced-apart wall elements each having an electrode attached thereto, said segments assembled together to form a polygonal solenoidal structure wherein said assembled magnetic elements cooperate to generate a toroidal-shaped magnetic field passing through each segment cross-wise to the flow of sea water there through.

12. The ocean wave energy conversion system of claim 11 further including centrally arranged flow diverter means to direct the sea water into said passageways and an exterior shell to prevent leakage of sea water from said segments as said structure is raised and lowered in the water by wave action on said float.

13. The ocean wave energy conversion system of claim 12 wherein said flow diverter means includes a pair of conical elements, in mutual, faced-apart arrangement located centrally of said structure and respectively at the upper and lower ends thereof.

14. The ocean wave energy conversion system of claim 11 wherein said magnetic elements are arranged orthogonal to said passageways and to the flow of sea water there through.

15. The ocean wave energy conversion system of claim 11 wherein said magnetic elements are arranged orthogonal to said passageways and said electrodes are arranged orthogonal to the magnetic field formed in said structure.

16. The ocean wave energy conversion system of claim 11 further including rectifying means for controlling the polarity of the electrical energy generated in said magnetohydrodynamic electric generator means to provide a constant polarity to the energy transmitted therefrom.

17. The ocean wave energy conversion system of claim 11 wherein said electrode means includes means connected to said electrode means for operating a hydrolysis generating unit to produce oxygen and hydrogen gasses.

18. The ocean wave energy conversion system of claim 11 wherein said electrode means includes means connected to said electric means for converting sea water to fresh water.

19. An ocean wave energy conversion system comprising:
a) a float adapted to ride on the surface of the ocean in reciprocal vertical motion in response to ocean wave front action;
b) first support means rigidly extending downward from said float deeper into the ocean;
c) magnetohydrodynamic electric generator means mounted to said first means at a level of attenuated vertical wave action in the ocean, said generator comprising:
i) a duct arranged to channel the flow of sea water vertically therethrough in response to the reciprocal vertical motion of said float and further including an elongated constricted portion formed in said duct and axially aligned therewith, defined by a pair of outwardly opening, flared passageways extending from each end of said constricted portion for increasing the velocity of sea water therethrough;
ii) second means including magnetic superconductor fed field elements for applying a strong magnetic field orthogonal to the longitudinal axis of said duct and the flow of sea water therethrough;
iii) electrode means positioned in said duct and in contact with and orthogonal to the flowing sea water therethrough such that said electrode means receives electrical energy generated by magnetohydrodynamic phenomenon as the sea water passes upwardly and downwardly in a relative manner through the magnetic field said electrode means further includes conductor means connected thereto for conveying the generated electrical energy outward from said magnetohydrodynamic electric generator means to an external sealed load;

iv) rectifying means for controlling the polarity of the electrical energy generated in said magnetohydrodynamic electric generator means to provide a constant polarity to the energy transmitted therefrom; and, v) transfer means connected to said electrode for conveying the generated electrical energy outward from said magnetohydrodynamic electric means generator to an external electric load.

* * * * *